… … …

United States Patent

Ku et al.

[11] Patent Number: 5,823,275
[45] Date of Patent: Oct. 20, 1998

[54] HIGH-SPEED DRILL FOR ROCK STAKE ENGINEERING

[76] Inventors: Chun-Yi Ku; Chao-Hsiang Ku, both of P.O. Box 28–24, Kaohsiung, Taiwan

[21] Appl. No.: 783,333

[22] Filed: Jan. 16, 1997

[51] Int. Cl.⁶ .......................... B23B 27/10; E21B 10/02; E21B 10/60
[52] U.S. Cl. ..................... 175/403; 125/20; 408/59; 408/204; 451/450
[58] Field of Search .................... 299/41.1; 175/393, 175/403; 408/57, 59, 204; 125/11.22, 20; 451/450, 488

[56] References Cited

U.S. PATENT DOCUMENTS

| | | | |
|---|---|---|---|
| 3,153,885 | 10/1964 | Keller et al. | 125/20 X |
| 3,424,255 | 1/1969 | Mori et al. | 175/403 X |
| 5,092,716 | 3/1992 | Omi | 408/59 |

FOREIGN PATENT DOCUMENTS

| | | | |
|---|---|---|---|
| 710794 | 8/1941 | Germany | 408/204 |
| 22008 | 1/1990 | Japan | 125/11.22 |
| 1450929 | 1/1989 | U.S.S.R. | 408/204 |

*Primary Examiner*—David J. Bagnell
*Attorney, Agent, or Firm*—Dougherty & Troxell

[57] ABSTRACT

A high-speed drill for rock stake engineering includes an outer tube and an inner tube fixed in the outer tube, and an annular space is formed by the outer and the inner tube for pressured air and water to flow down from a power shaft connected with an upper portion of the outer tube. An annular cushion block is connected with a bottom of the outer and the inner tube, having many through holes. Further, cutters are fixed under a bottom surface of the cushion block, rotating together with the outer tube rotated by the power shaft, cutting into rock and cooled and washed synchronously by the pressured air and water coming through the annular space down from the power shaft.

4 Claims, 4 Drawing Sheets

HIGH-SPEED DRILL FOR ROCK STAKE ENGINEERING

BACKGROUND OF THE INVENTION

This invention concerns a high-speed drill for rock stake engineering, particularly possible to prolong the service life of a drill and to ascertain smooth cutting into rock.

A known conventional high-speed drill shown in FIGS. 1 and 2 includes a hollow tube 10 having an inner surface 101 and a small-diameter upper portion connected firmly with a power shaft 2, and a plurality of cutters 11 firmly fixed spaced apart under a bottom surface of the tube 10.

When the cutters 11 together with the tube 10 are rotated by the power shaft 2, water is also made to flow down from the shaft 2 through the tube 10 for cooling the cutters 11 growing hotter and hotter by drilling into rock. In the drilling process, cut broken stone, and soil are exhausted out of an annular gap between an outer surface of the tube and rock being drilled. After an annular gap is drilled and the drill is pulled out, a steel pipe is buried in the gap and cement filling and stake punching processes follow.

The conventional drill 1 for rock stake engineering just described has been found to have the following drawbacks.

1. Water coming down from the power shaft may not accumulate at a bottom of the tube 10, but dispersing flow down so that the cutters 11 cannot be cooled enough, becoming too heated up and breaking, causing high cost for operation.

2. Water is not driven to flow with pressure so that water may accumulate in the tube 10 in static condition to warm up, hampering cutting action, and that cut broken stone may be hard to be exhausted out of the gap between the tube 10 and rock, resulting in difficult operation.

3. The cutters made of expensive alloy steel have to be replace frequently, resulting in high cost for personnel and budget and delay in building process.

4. In view of the drawbacks described above, the conventional drill for rock stake engineering is disadvantageous for a large scale construction, and unable to keep smooth continual operation.

SUMMARY OF THE INVENTION

The main purpose of the present invention is to offer a high-speed drill for rock stake engineering, possessing long service life and ability to cut into rock smoothly and deeply.

A feature of the invention is an outer tube and an inner tube fixed inside the outer tube so as to form an annular space for pressured air and water to flow down through the annular space. Water forced by pressurized air can cool and wash a plurality of cutters spaced apart on a bottom surface of a cushion block fixed on a bottom of the outer tube and the inner tube. The annular cushion block has many small through holes communicating with the annular space at an upper end surface and with the exterior at a lower end surface so that water may incessantly flow down from a power shaft fixed with an upper portion of the outer tube and flow out of an annular gap between the outer tube and rock. Thus the cutters can be prolonged in service life and have the effect of drilling smoothly and deeply in rock.

BRIEF DESCRIPTION OF DRAWINGS

This invention will be better understood by referring to the accompanying drawings, wherein.

DESCRIPTION OF THE PREFERRED EMBODIMENT

Figure 1:
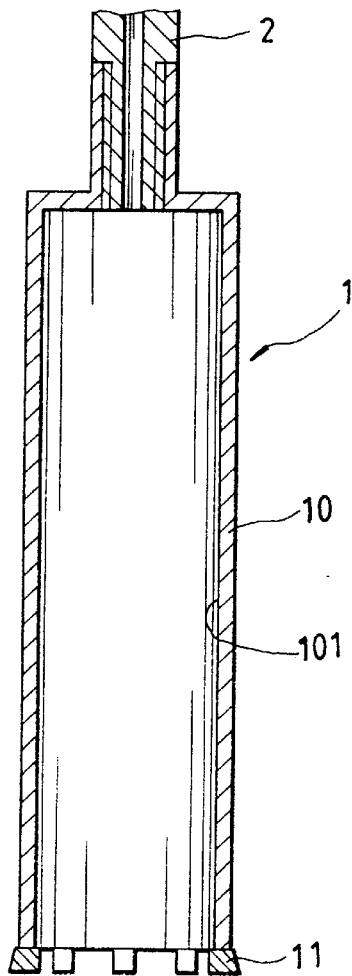
FIG. 1 is a cross-sectional view of a known conventional high-speed drill for rock stake engineering.
Figure 2:
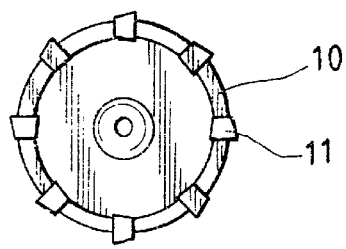
FIG. 2 is a bottom view of the known conventional high speed drill for rock stake engineering.
Figure 3:
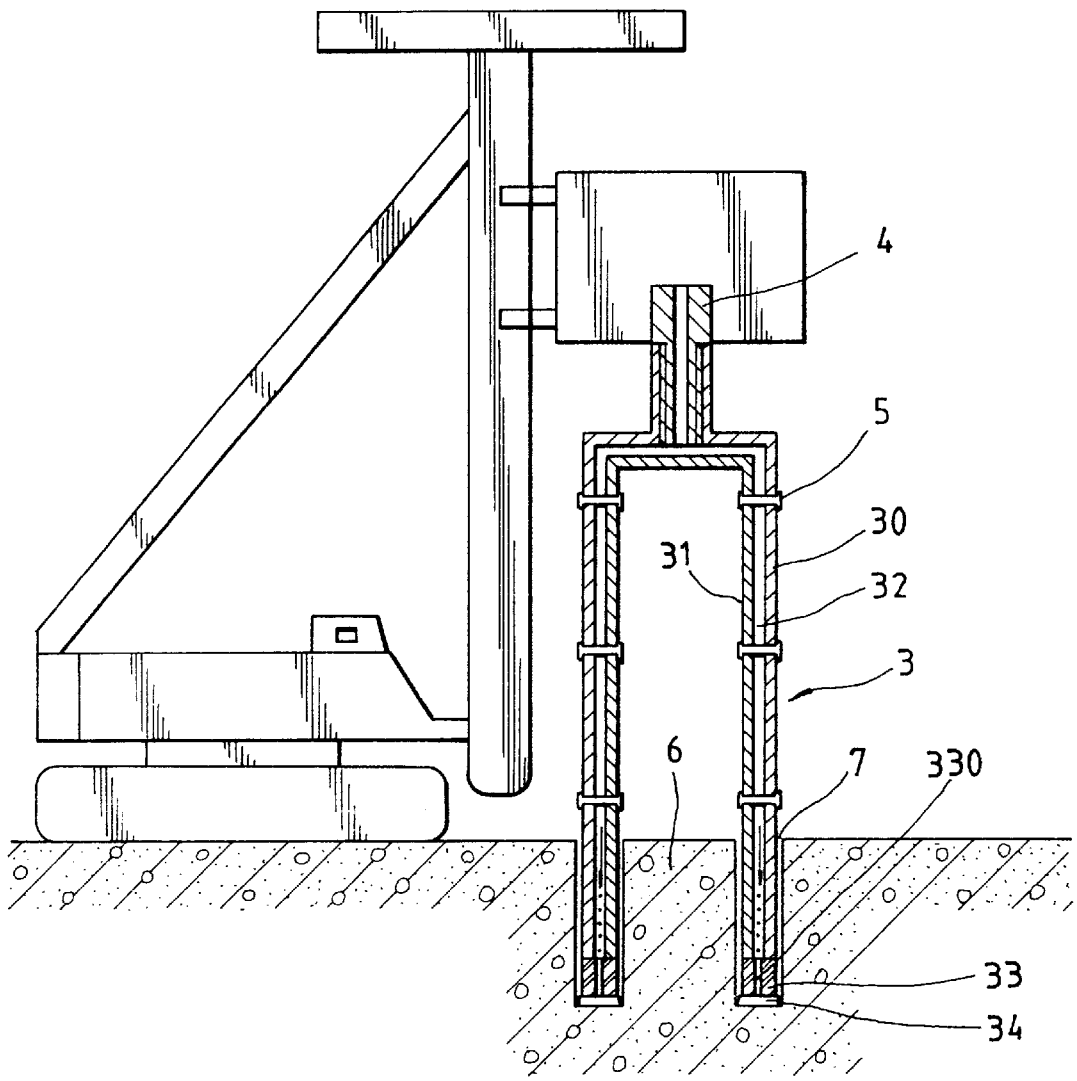
FIG. 3 is a cross-sectional view of a preferred embodiment of a high-speed drill for rock stake engineering in the present invention.
Figure 4:
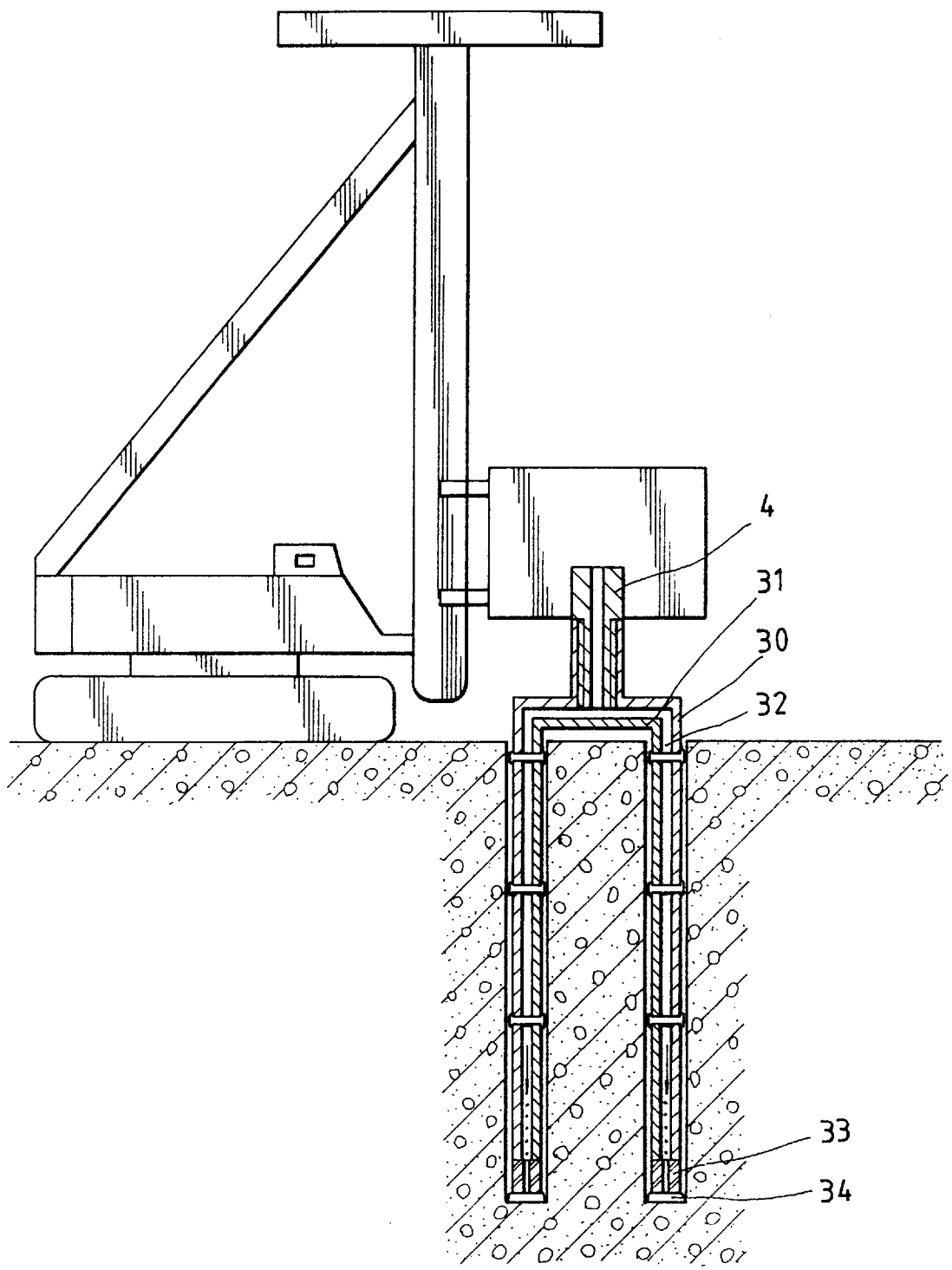
FIG. 4 is another cross-sectional view of the preferred embodiment of a high-speed drill for rock stake engineering in the present invention, showing the drill moving deep in rock.
Figure 5:
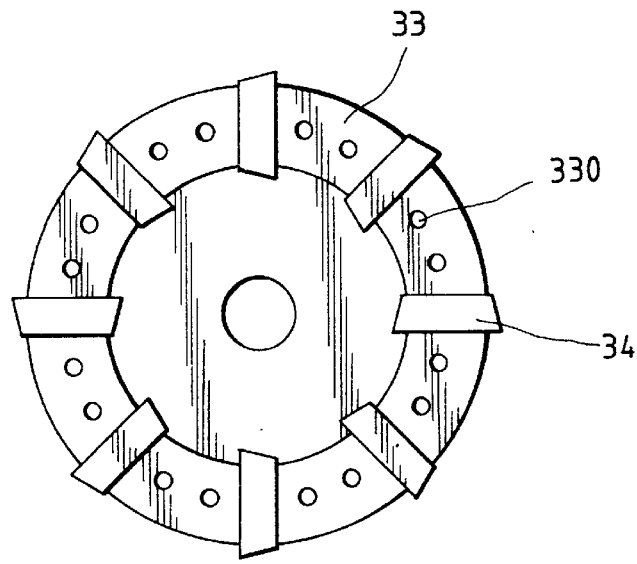
FIG. 5 is a bottom view of the preferred embodiment of a high-speed drill for rock stake engineering in the present invention; and, FIG. 6 is a cross-sectional view of a pipe buried and cement filled in an annular gap made by the drill in the present invention.

A preferred embodiment of a high-speed drill 3 for rock stake engineering in the present invention, as shown in FIGS. 3, 4, and 5 includes an outer tube 30 shaped as an elongate straight circular post with an inner hollow, an inner tube 31 shaped also as an elongate straight circular post with an inner hollow, an annular gap 32 formed between the outer tube 30 and the inner tube 31, a cushion block 33 fixed under the outer and the inner tube 30 and 31, and a plurality of cutters 34 fixed firmly under the cushion block 33.

The outer tube 30 has an upper small-diameter portion connected with a bottom portion of a power shaft 4, and a bottom open. The power shaft 4 is rotated with high speed, leading pressurized air and water into the outer tube 30 during rotating the outer tube 30.

The inner tube 31 is located within the outer tube 30, with the annular gap 32 formed between the inner tube 31 and the outer tube 30, connected together with the outer tube 30 by means of plural connecters 5 spaced apart and fixed firmly with the wall of both the tubes 30, 31 to keep the inner tube 31 in place.

The annular hollow space 32 is formed between the outer tube 30 and the inner tube 31 so that pressurized air and water coming from the power shaft 4 flows down and escapes out of the space 32 to the exterior.

The annular cushion block 33 is fixed with a bottom surface of both the tubes 30, 31 assisting to keep them firmly together, and provided with many small through holes 330 respectively having one end communicating with the annular hollow space 32 and other end communicating with exterior outer air. An outer peripheral surface of the cushion block 33 is preferably flush with an outer peripheral surface of the outer tube 30 and an inner peripheral surface is preferably flush with an inner peripheral surface of the inner tube 31. Therefore, it can be seen that the cushion block 33 surely reinforces combination of the both tubes 30, 31 by bridging the bottom of both 30, 31, and that the hollow space 32 also can communicate with outer air through the holes 330.

The plural cutters 34 fixed firmly on the bottom of the cushion block 33 rotate with the tubes 30, 31 rotated by the power shaft 4, cutting rock 6 gradually and deeply. Each cutter 34 has a cut edge extending to protrude inward through an inner edge of the cushion block 33 and out of an outer edge of the block 33 so that a gap 7 is formed between the outer tube 30 and rock 6, preventing the outer and the inner tube 30 and 31 from producing friction with rock and subsequent resistance, and permitting the cutters 34 to continue drilling into rock.

The general operation process of the present invention is described as follows. When the drill 3 consisting of the outer tube 30, the inner tube 31, the cushion block 33 and the cutters 34 is rotated by the power shaft 4, pressurized air and water flow down along the annular hollow space 32 to escape out into exterior outer air, with the cutters 34 cutting gradually down into rock 6. Meanwhile, water will stay at the bottom of the hollow space 32 and receive pressure from pressurized air flowing down (as an arrow shows in Figures), incessantly flowing out through the small holes 330 of the block 33, cooling and washing the cutters 34 at the same time. Thus water current is kept flowing by pressurized air, able to cool and wash the cutters 34 at the best location, the bottom of the tubes 30, 31. As for the water and the air coming into the hollow space 32, water may surely accumulate first at the bottom of the hollow space 32 and then flows out of the small holes 330 forced by the pressurized air, cooling and washing synchronously the cutters 34 with pressure. In addition, water and pressurized air incessantly flow into the hollow space 32 so that the above operation may continue without interruption. The quantity of water exhausted may be approximately the same as that of pressurized air. Further, small cut stone, sand and soil will be carried out through the gap 7, mixed with water plus pressurized air. Consequently, with the drill of the invention it is possible to drill into rock 6 smoothly to a desired depth. The rock drilled with an annular gap 7 with the drill 3 of the invention has a center portion defined by the annular gap 7 either be left as it is or cut off according to need.

Figure 6:
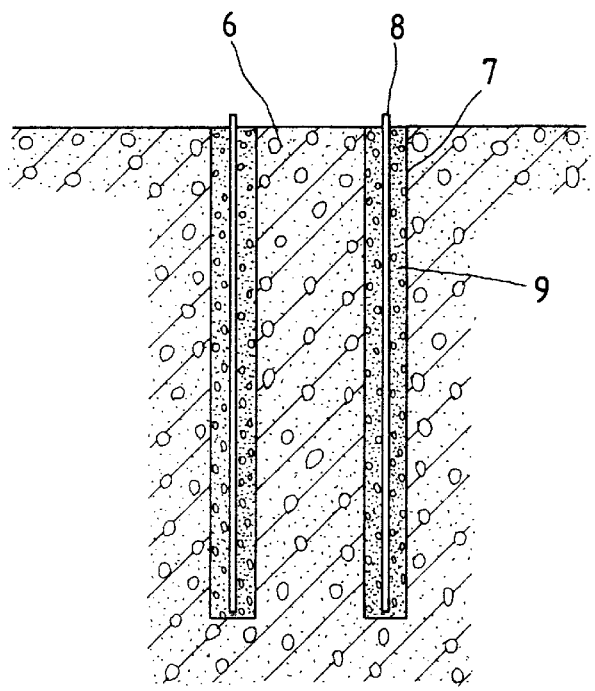

As shown in FIG. 6, after the annular gap 7 is bored by the drill 3 of the invention, a steel pipe 8 can be buried in the gap 7 and then cement 9 can be filled therein for firmly holding the pipe 8 in place with the rock 6 and always maintaining the base strength of the dimensions that the rock 6 covers.

As can be seen from the above description, the high-speed drill according to the present invention has the following advantages over an conventional high-speed drill for rock stake engineering.

1. Water current always flows to cool and wash the cutters 34, which are rather expensive, and prevents them from breaking, thus reducing cost to a large degree.

2. Water current is forced to flow down by pressurized air, with cut broken small stone, sand and soil being exhausted through the annular gap 7 to the exterior of the outer tube 30, guaranteeing smooth operation of the drill.

3. The material of the drill should be special alloy steel of high cost, and the drill in the present invention is well protected so that it does not need to be replaced with new ones frequently, resulting in ascertaining operation schedule and cost saving for personnel and budget.

4. In view of the above advantages, this drill is evidently extremely useful for keeping drilling operation continuously and smoothly.

While the preferred embodiment of the invention has been described above, it will be recognized and understood that various modifications may be made therein and the appended claims are intended to cover all such modifications which will fall within the spirit and scope of the invention.

What is claimed is:

1. A high-speed drill for rock stake engineering comprising:

an outer tube having a cylindrical configuration with a hollow interior, an open bottom, and a small-diameter upper portion connected with a high speed rotatable power shaft so as to rotate therewith, the upper portion having a passage for directing pressurized air and water into the interior said outer tube during rotation;

an inner tube also having a cylindrical configuration with a hollow interior and an open bottom, located within said outer a hollow space is defined by an inner surface of said outer tube and an outer surface of said inner tube, said hollow space receiving pressurized air and water from said passage and enabling pressurized air and water to flow downwardly therein:

a plurality of connectors connected to said outer tube and said inner tube to fixedly attach the outer and inner tubes together, the plurality of connectors extending through the hollow space, an annular cushion block attached to and bridging the open bottom of said outer tube and said inner tube, the annular cushion block having a plurality of through holes, one end of each said through hole communicating with said hollow space and another end thereof communicating with an exterior of said outer tube; and, a plurality of cutters fixed to bottom of said annular cushion block in spaced-apart positions so as to rotate together with said outer tube and said inner tube to cut into rock.

2. The high-speed drill for rock stake engineering as claimed in claim 1, wherein each of said plurality of cutters has a cutting edge extending inwardly beyond an inner surface of said inner tube and outwardly beyond an outer surface of said cushion block.

3. The high-speed drill for rock stake engineering as claimed in claim 1, wherein an outer peripheral surface of said cushion block is flush with an outer peripheral surface of said outer tube and an inner peripheral surface of said cushion block is flush with an inner peripheral surface of said inner tube.

4. The high-speed drill for rock stake engineering as claimed in claim 1 and further comprising:

a) an outer end wall extending across an upper end of the outer tube, the passage extending through the outer end wall; and b) an inner end wall extending across an upper end of the inner tube, the inner end wall being spaced from the outer end wall.

* * * * *